United States Patent Office 3,280,058
Patented Oct. 18, 1966

3,280,058
POLYOLEFINS STABILIZED WITH MIXTURES OF PHENOL SULFIDES AND ESTERS OF THIODI-ETHYLENE GLYCOL
Cornelio Caldo, Terni, Italy, assignor to Montecatini Società Generale per l'Industria Mineraria e Chimica, Milan, Italy
No Drawing. Filed Dec. 7, 1962, Ser. No. 243,708
Claims priority, application Italy, Dec. 11, 1961, 22,283/61
11 Claims. (Cl. 260—23)

The present invention relates to stabilized polymeric poly-alpha-olefin compositions and to a method for the stabilization of fibers, films and other manufactured articles made of crystalline polymers of alpha-olefins, and particularly of polypropylene.

In Italian patent application No. 13,569/60 filed on August 1, 1960, and in U.S. application Serial No. 127,987 filed July 31, 1961, now U.S.P. 3,236,805, there is described a class of thioesters of the general formula:

R—C(=O)—O—(CH$_2$)$_2$—S—(CH$_2$)$_2$—O—X    (1)

in which R is an aliphatic radical having a long linear or branched chain, and X is H or the group

Typical of such thioesters are, for example, thio-diethyleneglycol dilaurate, thio-diethyleneglycol-monolaurate, thio-diethyleneglycol distearate, thio-diethyleneglycol-monostearate, and the like.

I have now surprisingly found that a mixture of a dialkyl phenol sulfide with a thioester of the general formula:

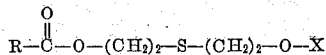

in which R and X have the aforementioned meaning, exerts a considerably higher stabilizing action when such mixture is incorporated into a crystalline olefin polymer capable of use in fibers or films.

If an organic salt of stearic acid (having the function of an antiacid agent), e.g., calcium stearate, is added to the mixture of thioester (of the general Formula 1) and dialkyl phenol sulfide, the stability characteristics of the polymeric compositions are improved.

The synergistic mixtures of the present invention are effective also in the stabilization of compositions of a crystalline polyolefin and a basic nitrogen compound, (e.g., polyalkyleneimines, condensation products of di-chloroethane with polyfunctional amines, condensation products of epichlorohydrin with amines, polyvinylpyridine, etc.) which compositions can be used to obtain fibers having improved tinctorial characteristics.

In accordance with the present invention, polymeric compositions are obtained which are stabilized against heat, ageing and light, which compositions comprise:

(a) A crystalline polyolefin, particularly polypropylene, (b) An amount of from about 0.2 to 2% by weight, based on the weight of polyolefin, of a mixture of a dialkylphenol sulfide and an aliphatic thioester of the Formula 1, which ester may be obtained by the esterification of thiodiethyleneglycol with an aliphatic acid.

The stabilizing mixture can be used in combination with pigments, dyes and with substances having the character of antiacid agents, such as the inorganic salts of stearic acid.

Particularly suitable dialkylphenolsulfides include 4,4'-thiobis-6-tertiary butyl-metacresol; 2,2'-thiobis-4-tertiary octyl phenol, 4,4'-thiobis phenol, 2,2'-thiobis-phenol, 4,4'-thiobis-cresol, 2,2'-thiobis-cresol and the like.

Typical of the thioesters of the general Formula 1

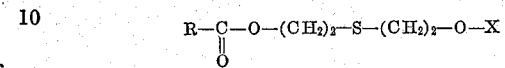

in which R and X have the aforementioned meaning, are thio-diethyleneglycol dilaurate, thio-diethyleneglycol monolaurate, thio-diethyleneglycol distearate and thio-diethyleneglycol monostearate.

If an inorganic salt of stearic acid is employed, calcium stearate gives good results.

In the stabilized mixture the proportion of dialkyl-phenol sulfide can be varied from 1 to 99% by weight of the total mixture of stabilizers.

A further aspect of the invention is in a process for stabilizing crystalline polyolefins, more particularly poly-propylene, which process comprises intimately admixing with the polyolefins an amount of from about 0.2 to 2% by weight, based on the weight of polyolefin, of a mixture of a dialkylphenol sulfide and a thioester of the Formula 1

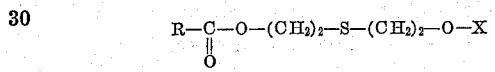

in which R and X have the aforementioned meaning.

The application of the stabilizing mixture to the polyolefin is generally carried out by mixing the stabilizers in the form of powders with the polyolefins while agitating.

The stabilizers can be added, however, by other methods, e.g., by mixing the polyolefin with a solution of the stabilizers in a suitable solvent and then evaporating the solvent, or by adding the stabilizer to the polyolefin at the end of the polymerization. It is also possible to obtain the stabilizing action by aplying the stabilizing compounds onto the resultant manufactured articles, e.g., by immersing the article in a stabilizer solution or dispersion and then evaporating the solvent.

The stabilizers of the present invention exhibit a good compatibility with polyolefins in the molten state and have no staining action.

The stabilized compositions of the present invention are particularly suitable for preparing mono- and pluri-filaments, continuous or staple fibers or bulky fibers. They can also be used for preparing films, tapes, shaped articles and the like.

The following examples reported in Table 1 will further illustrate the invention.

The crystalline polypropylenes used in these examples consist prevailingly (over 50%) of isotactic macromolecules. They were prepared with the aid of stereospecific catalysts from an alkyl aluminum compound and a crystalline transition metal halide.

Examples 1 and 2 illustrate the use of one of the stabilizing mixtures of my invention and Example 3 represents a control which does not contain my stabilizing mixture.

TABLE 1

| | Example 1 | Example 2 | Example 3 | Example 4 | Example 5 | Example 6 |
|---|---|---|---|---|---|---|
| Composition of the Mixture: | | | | | | |
| (a) Polypropylene: | | | | | | |
|     Intrinsic Viscosity [1] [η] | 1.6 | 1.5 | 1.6 | 1.5 | 1.5 | 1.5. |
|     Ash content | 0.029% | 0.018% | 0.029% | 0.015% | 0.015% | 0.015%. |
|     Residue after boiling heptane extraction | 94.4% | 96.7% | 94.4% | 96.2% | 96.2% | 96.2%. |
| (b) Calcium stearate, percent (based on weight of polypropylene) | 0.3 | 0.3 | | 0.3 | 0.3 | 0.3. |
| (c) Stabilizer, percent: thio-diethyleneglycol dilaurate | 0.5 | 0.5 | | | 0.5 | 0.5. |
|     4,4'-thiobis-6-tertiary butyl-metacresol | 0.2 | 0.2 | | 0.3 | | 0.3. |
| Mix technology | Henschel | Henschel | Henschel | Henschel | Henschel | Henschel. |
| Color of the molten mixture in a test tube at 250° C. for 10 minutes | Clear | Clear | Clear | Clear | Clear | Clear. |
| Spinning conditions: | | | | | | |
|     Screw temperature | 210° C | 230° C | 210° C | 250° C | 250° C | 250° C. |
|     Extrusion head temperature | 220° C | 240° C | 220° C | 250° C | 240° C | 250° C. |
|     Spinneret temperature | 215° C | 220° C | 215° C | 250° C | 250° C | 250° C. |
|     Spinneret type, mm | 40/0.8 x 16 | 60/0.8 x 16 | 40/0.8 x 16 | 60/0.8 x 16 | 60/0.8 x 16 | 60/0.8 x 16. |
|     Maximum pressure (kg./cm.²) | 50 | 45 | 50 | 61 | 65 | 58. |
|     Winding speed (meters/minute) | 350 | 500 | 350 | 390 | 390 | 390. |
| Stretching conditions: | | | | | | |
|     Temperature | 120° C | 120° C | 120° C | 120° C | 120° C | 120° C. |
|     Medium | Steam | Steam | Steam | Steam | Steam | Steam. |
|     Stretching ratio | 1:5 | 1:5.3 | 1:5 | 1:5 | 1:5 | 1:5. |
| Characteristics of the stretched yarn: | | | | | | |
|     Tenacity, g./den | 5.6 | 5.6 | 5.5 | 5.35 | 5.26 | 5.6. |
|     Elongation, percent | 26.8 | 24.2 | 25.2 | 24.5 | 24.2 | 23.8. |
| Thermal degradation (percent decrease of the intrinsic viscosity upon extrusion) | 77 | 73 | 71 | 71 | 74 | 71. |
| Stability to accelerated thermal ageing (percent residual tenacity after exposure at 120° C. for 15 hours in an oven with air circulation) | 92 | 91 | Brittle | 92 | 92 | 94. |
| Stability to sun light (percent residual tenacity after exposure to summer sun light for 200 hours) | 50 | 51 | 29 | 30 | 46 | 52. |
| Stability to accelerated thermal ageing (percent residual tenacity after exposure at 120° C. for 200 hours in an oven with air circulation) | | | | Brittle (already after 150 hours) | Brittle (already after 100 hours) | 89%. |

[1] Determined in tetrahydronaphthalene at 135° C.

Variations can of course be made without departing from the spirit of my invention.

Having thus described my invention what I desire to secure and claim by Letters Patent is:

1. A stabilized polymeric composition comprising a polymer of a monoolefin having from 2 to 4 carbon atoms, said polymer consisting of over 50% of isotactic macromolecules, and a stabilizing mixture of a dialkylphenol sulfide and a thioester of the general formula

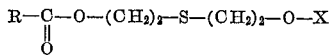

in which R is a saturated straight chain aliphatic radical having from about 12 to 18 carbon atoms and X is selected from the group consisting of H and the radical

said dialkylphenol sulfide being present in an amount of from about 29 to about 38% by weight of said stabilizing mixture.

2. The polymeric composition of claim 1 wherein the polyolefin is polypropylene.

3. The polymeric composition of claim 1 wherein the amount of stabilizing mixture is from about 0.02 to 2% by weight, based on the weight of said polyolefin.

4. The polymeric composition of claim 1 wherein the amount of stabilizing mixture is from about 0.2 to 1% by weight, based on the weight of said polyolefin.

5. The polymeric composition of claim 1 wherein the thioester is thio-diethyleneglycol dilaurate.

6. The polymeric composition of claim 1 wherein the dialkylphenol sulfide is 4,4'-thio-bis-6-tertiary butylmetacresol.

7. The polymeric composition of claim 1 wherein the dialkylphenol sulfide is 2,2'-thio-bis-4-tertiary octyl phenol.

8. The polymeric composition of claim 1, which composition contains in addition from about 0.1 to 2% of a metal salt of stearic acid.

9. The composition of claim 8, wherein said salt is calcium stearate.

10. The product of claim 1 in filamentary form.

11. The product of claim 1 in film form.

References Cited by the Examiner

UNITED STATES PATENTS

| | | | |
|---|---|---|---|
| 2,965,060 | 12/1960 | Ford et al. | 260—45.75 |
| 3,069,369 | 12/1962 | Galbraith et al. | 260—23 |
| 3,222,318 | 12/1965 | Lecher et al. | 260—23 |
| 3,226,357 | 12/1965 | Braus et al. | 260—23 |

LEON J. BERCOVITZ, *Primary Examiner.*

DONALD E. CZAJA, *Examiner.*

R. A. WHITE, *Assistant Examiner.*